United States Patent
Jamar et al.

(10) Patent No.: US 9,751,292 B2
(45) Date of Patent: Sep. 5, 2017

(54) FOIL GUIDING SYSTEM FOR ADDITIVE FABRICATION

(75) Inventors: Jacobus Hubertus Theodoor Jamar, Vessem (NL); Herman Hendrikus Maalderink, Nuenen (NL); Jeroen Anthonius Smeltink, Mierlo (NL); Maarten Van Lent, Eindhoven (NL)

(73) Assignee: DSM IP ASSETS B.V., Heerlen (NL)

( * ) Notice: Subject to any disclaimer, the term of this patent is extended or adjusted under 35 U.S.C. 154(b) by 851 days.

(21) Appl. No.: 13/824,143

(22) PCT Filed: Oct. 31, 2011

(86) PCT No.: PCT/NL2011/050734
§ 371 (c)(1),
(2), (4) Date: Apr. 29, 2013

(87) PCT Pub. No.: WO2012/060696
PCT Pub. Date: May 10, 2012

(65) Prior Publication Data
US 2013/0213567 A1    Aug. 22, 2013

(30) Foreign Application Priority Data

Nov. 1, 2010  (EP) .................................... 10189599

(51) Int. Cl.
*B29C 35/08*  (2006.01)
*B32B 38/18*  (2006.01)
(Continued)

(52) U.S. Cl.
CPC .......... *B32B 38/18* (2013.01); *B29C 35/0805* (2013.01); *B29C 67/007* (2013.01);
(Continued)

(58) Field of Classification Search
CPC ............ B29C 35/0805; B29C 67/0062; B29C 67/0085; B33Y 30/00; B33Y 10/00;
(Continued)

(56) References Cited

U.S. PATENT DOCUMENTS 2,898,662 A  *  8/1959  Robertson ............... B29C 55/08
                                                  100/162 B
3,167,843 A      2/1965  Robertson et al.
(Continued)

FOREIGN PATENT DOCUMENTS

DE       26 20 772        6/1977
DE   10 2008 043310        5/2010
(Continued)

OTHER PUBLICATIONS

International Search Report for PCT/NL2011/050734 mailed Feb. 16, 2012.
(Continued)

*Primary Examiner* — Yogendra Gupta
*Assistant Examiner* — Ninh Le
(74) *Attorney, Agent, or Firm* — Daniel S. Bujas (57) ABSTRACT

An additive fabrication apparatus with an efficient reversal mechanism to reverse the orientation of foil guiding rollers is contemplated. To this end, according to an aspect, a foil guiding system comprising: a flexible foil guiding roller; and a bearing system arranged to bear said guiding roller, said bearing system comprised of end locking elements axially locking to the roller; a bearing arrangement defining a bearing position having the roller curved in bearing engagement. The bearing arrangement engages with an outer face of said roller in a manner so as to thereby flex the roller between at least two bearing positions in conformity with a rolling direction. The flexible roller in connection with the outside bearings replaces a fixed shaft arrangement of the (Continued)

prior art, which is easily tunable to the foil movement direction.

14 Claims, 6 Drawing Sheets

(51) Int. Cl.
| | |
|---|---|
| *B29C 67/00* | (2017.01) |
| *B33Y 40/00* | (2015.01) |
| *B33Y 10/00* | (2015.01) |
| *B65H 23/025* | (2006.01) |
| *B33Y 30/00* | (2015.01) |

(52) U.S. Cl.
CPC ...... *B29C 67/0062* (2013.01); *B29C 67/0085* (2013.01); *B29C 2035/0838* (2013.01); *B33Y 10/00* (2014.12); *B33Y 30/00* (2014.12); *B33Y 40/00* (2014.12); *B65H 23/0258* (2013.01)

(58) Field of Classification Search
CPC ........... B33Y 40/00; B32B 38/18; D06C 3/00; B65H 23/0258
See application file for complete search history.

(56) References Cited

U.S. PATENT DOCUMENTS

| | | | | |
|---|---|---|---|---|
| 3,248,031 | A | * | 4/1966 | Kilmartin .......... B65H 23/0258 226/194 |
| 4,699,606 | A | * | 10/1987 | Whitley, Jr. ......... A24D 3/0295 226/108 |
| 2007/0259066 | A1 | | 11/2007 | Sperry et al. |
| 2008/0179787 | A1 | * | 7/2008 | Sperry ................ B29C 67/0062 264/308 |
| 2009/0110762 | A1 | | 4/2009 | Baumann et al. |

FOREIGN PATENT DOCUMENTS

| | | |
|---|---|---|
| EP | 1 852 243 | 11/2007 |
| GB | 1 019 958 | 2/1966 |
| WO | WO 2010/074566 | 7/2010 |

OTHER PUBLICATIONS

Written Opinion of the International Searching Authority mailed Feb. 16, 2012.

* cited by examiner

FOIL GUIDING SYSTEM FOR ADDITIVE FABRICATION

This application is the U.S. national phase of International Application No. PCT/NL2011/050734 filed 31 Oct. 2011 which designated the U.S. and claims priority to EP 10189599.3 filed 1 Nov. 2010, the entire contents of each of which are hereby incorporated by reference.

FIELD AND BACKGROUND OF THE INVENTION

In additive fabrication processes with high imaging resolution, in some cases 50 micron or better, that utilize a moveable carrier foil for carrying liquid build material, it is required that the carrier foil be free from wrinkling or excessive stretching. In some processes, this is particularly challenging since the carrier foil must be stationary at the current imaging location while being in motion elsewhere in the additive fabrication process to allow for simultaneous imaging and recoating. Any wrinkling or unanticipated stretching of the foil is undesirable in any foil-based additive fabrication process.

Additive fabrication processes that utilize a UV transparent carrier foil are known. For instance, U.S. Pat. No. 6,557,452 to Fudim utilizes a foil to transport liquid build material to an imaging location. The liquid build material is imaged upon reaching the imaging location and becomes solid. The solid adheres to the previously formed layer of the tangible object and the foil is then moved in order to transport additional liquid build material to the imaging location in order to form the next solid layer. This process is repeated in order to build a solid three-dimensional object. Similarly, U.S. Pat. No. 7,467,939 and U.S. Pat. No. 7,731,887 to 3D Systems, Inc. disclose foil based additive fabrication processes. In each of these processes, the foil is held stationary as the liquid build material is imaged.

In a certain additive fabrication process, the liquid build material may be imaged at one location while the foil is in motion at another location. This process, disclosed in WO2010/074566 to TNO, requires that the foil be kept motionless and wrinkle-free at the imaging location while the foil is in motion elsewhere.

In foil-based additive fabrication processes it is important that the foil does not move, wrinkle, or excessively stretch in any direction at the imaging location. This difficulty is further complicated when the system is capable of bi-directional movement.

A mechanism for additive fabrication which allows for wrinkle-free motion of a foil, especially in a system capable of bi-directional motion, would thus be desirable.

SUMMARY OF THE INVENTION

An efficient mechanism to control motion of the foil used in an additive fabrication is contemplated. According to an aspect, a foil guiding system comprises: a flexible foil guiding roller; and a bearing system arranged to bear said guiding roller, said bearing system comprised of end locking elements axially locking to the roller; a bearing arrangement defining a bearing position having the roller flexed in bearing engagement is utilized to control foil movement. The bearing arrangement engages with an outer face of said roller in a manner so as to thereby flex the roller between at least two bearing positions in conformity with a rolling direction.

Furthermore, the present invention provides a method of additive fabrication wherein the curvature of at least one foil guiding roller is modified in response to a first rolling direction, a liquid layer is formed on the foil, the foil is moved, the liquid layer is contacted with a tangible object, the liquid layer is solidified thereby forming a solidified layer as a new layer of the tangible object, the foil is removed from contact with the solidified layer, the curvature of the at least one foil guiding roller is modified in response to a second rolling direction, a second liquid layer is formed on the foil, the foil is moved, the second liquid layer is contacted with the tangible object, the second liquid layer is solidified thereby forming a second solidified layer as a new layer of the tangible object, the foil is removed from contact with the second solidified layer, and the method is repeated to build a three-dimensional object.

Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION

According to an aspect, the foil used in a reciprocating additive fabrication process can be appropriately controlled, by providing the curved rollers, in particular, the roller shafts, in a flexible form instead of rigid wherein the curvature of the rollers can be completely reversible. In an embodiment the rollers are provided as a single piece rod. The curvature can be changed with relatively low force, in some embodiments even a force (only) provided by the foil movement drag force, when the roller surface is tuned to define a foil drag force defining the roller flexing curvature.

The flexible roller arrangement in connection with the outside bearings of aspects of the instant claimed invention replaces a fixed shaft arrangement of the prior art. This flexible roller arrangement is easily tunable to the foil movement direction. Moreover, the foil guiding system allows complete reversal of roller orientation without wrinkling of the foil.

A known solution for foil wrinkling in a web winding process is the use of curved rollers, see e.g. GB1019958, where the roller is flexible and rotates around a non-flexible curved shaft. The bulge of the curvature points in the direction of sheet movement. By the friction between sheet and roller surface the sheet is stretched in the transverse direction between the point where it first touches the rollers and the point where it leaves the roller, and wrinkles are eliminated over an area extending from the roller in the direction of the foil movement. A further disclosure is known from EP0431275 which shows a mechanism to vary deflection angle to produce a desired spreading. However, a reversal of the foil direction is not contemplated. In U.S. Pat. No. 3,248,031, a curved roller is disclosed that can be bowed in multiple directions by a disclosed bearing system. However, a multi-roller device which allows for reversal of direction in an additive fabrication apparatus has not been contemplated by the prior art.

Figure 1:
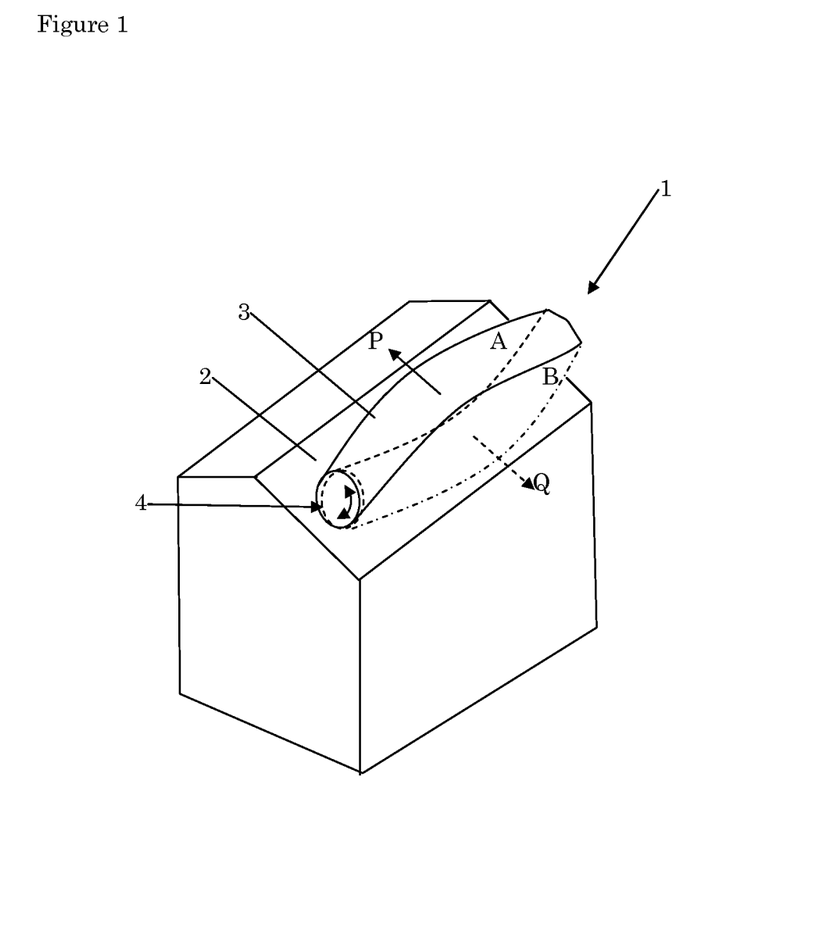
FIG. 1 schematically shows a sectional side view of an example of an embodiment of a system according to the invention.

FIG. 1 schematically shows a sectional side view of an embodiment of a system 1 according to an aspect of the invention. As can be seen in the figure, an outside support bearing is provided in the form of a flat surface 2 engageable with an outer face 3 of roller 4. The face 2 is supporting the flexed roller 4 on its outer surface 3. The flexed condition implies a certain flexible resilience of the roller, wherein the roller is bent in a curve under a certain stress. The deforming may be of elastic nature which can be favorable in terms of energy conservation, but may also be slightly non-elastic. The surface 2 thereby enables rolling movement of the guiding roller 4 relative to the surface 2 while in flexed condition, in a manner so as to thereby flex the roller between at least two bearing positions A, B in conformity with a rolling direction P, Q. In first foil transport direction P the roller is flexed upwards in a first bearing position A, and an opposite foil transport direction Q, flexes the roller downwards in a curvature B that is reversed relative to the first bearing position. The bearing position can be adjusted and need not be symmetrical if a change of foil speed is applied in the two directions P, Q. Accordingly, the bearing arrangement 1 permits a change of flexing of the roller shaft 4 along a path on the bearing surface 2. Accordingly, one or more rollers 4 are provided that have a reversible curvature, wherein the curvature inverts when the direction of foil transport P, Q is reversed. It is noted that a conventional arrangement of non-flexible curved rollers may cause wrinkles in a reversal of foil transport, the curves bulging in the movement direction may cause wrinkles when the curving remains fixed and the movement direction reverses relative to the bulging.

Figure 2:
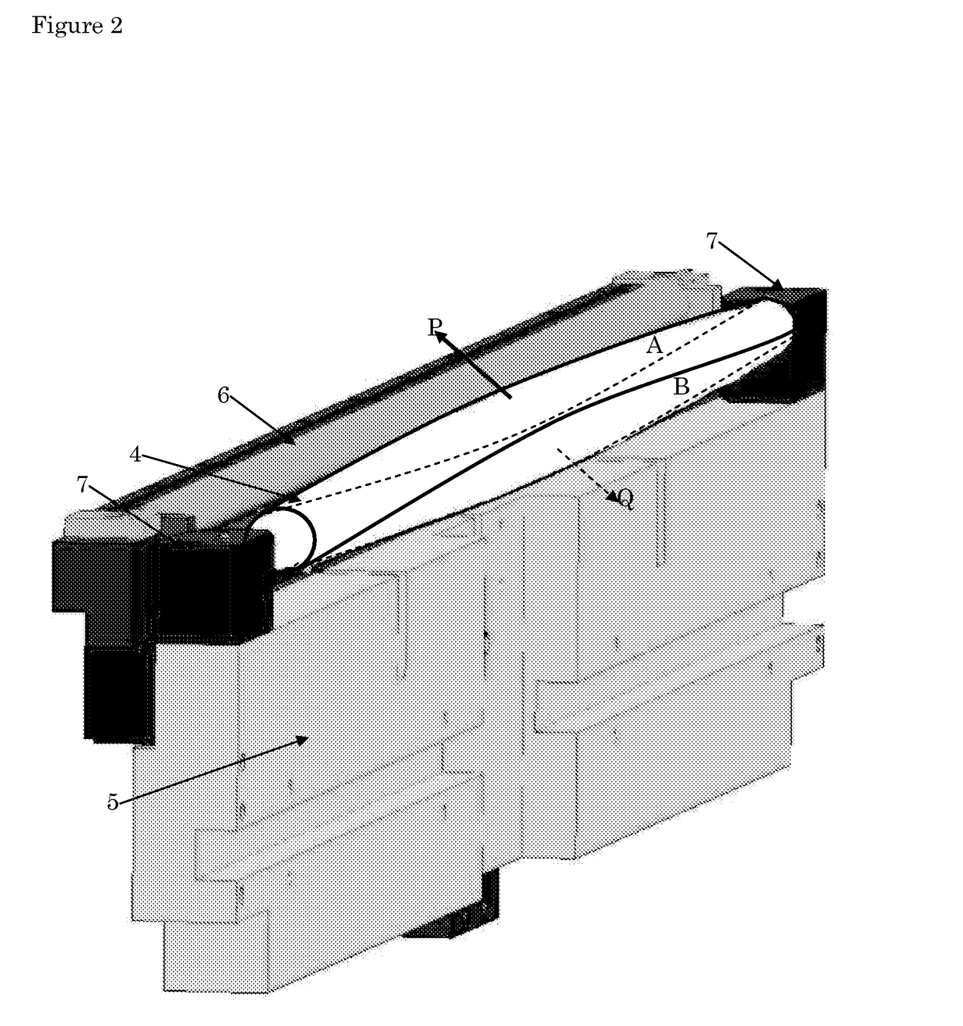
FIG. 2 shows the embodiment of FIG. 1 in more detail in a foil guiding arrangement.

FIG. 2 shows the embodiment of FIG. 1 in more detail in a foil guiding arrangement. Here, a support structure 5 is provided supporting an additional rigid roller 6 in close vicinity of the flexed roller 4. The support structure 5 further provides a lock structure 7 locking the flex roller 4 axially.

The lock structure 7 can be fixed relative to the support 5, and may comprise bearings arranged to enable a twist around its center points, due to the change in direction of the roller axis 4 due to its flexing. The bearings may be of a self-alignment ball bearing type, which permit a misalignment between the inner and outer races. Accordingly, the flexible roller 4 can be locked between end locks 7 axially locking the roller 4. The rigid roller 6 is formed as a foil guiding element that guides the foil (not shown) towards and from a contact area arranged on a side of the flex roller 4 and further addressed below. In some embodiments, the guiding element 6 can be a non-rollable guide forming an edge of the contact face.

Figure 3:
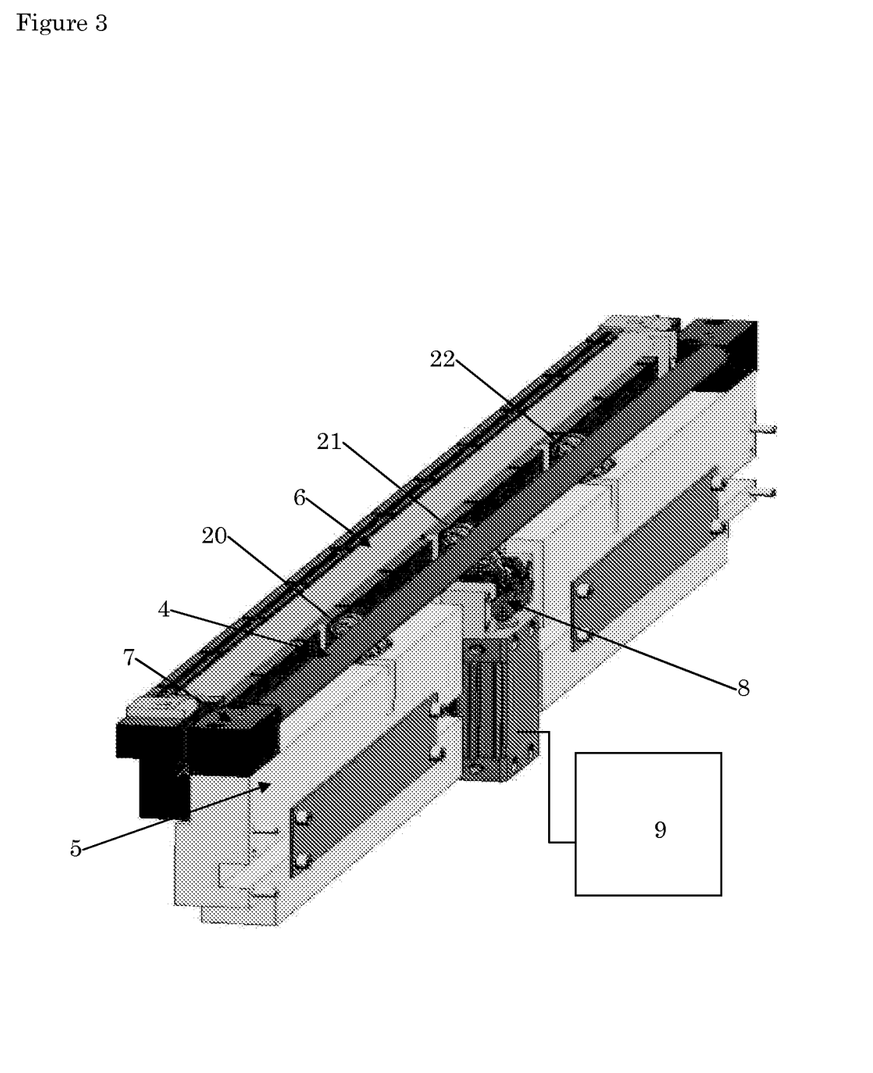
FIG. 3 schematically shows a perspective side view of further embodiment.

FIG. 3 schematically shows a perspective side view of further embodiment of an aspect of the invention. In this embodiment, a plurality of bearing elements 20, 21, 22 define a bearing contact for roller 4. While the embodiment of FIG. 2 may be provided with a passive bearing arrangement 1 wherein the flexing force is derived from the tension of the sheet on the rollers, as further clarified in connection with the FIG. 5 arrangement, preferably, the force to generate the (change in) curvature is derived actively from an actuator 8, e.g. of a pneumatic type. A controller 9 is provided to have the actuator 8 controlled in conformity with the rolling direction P, Q (see FIG. 2). The roller 4 is axially locked by locks 7 and has two intermediate bearing 20, 22 contacts that comply passively with a flexing movement of the roller when a central bearing is actuated. For rollers of a specifically desired flexing curvature, a plurality of actuators may be provided along the flexible roller.

Figure 4:
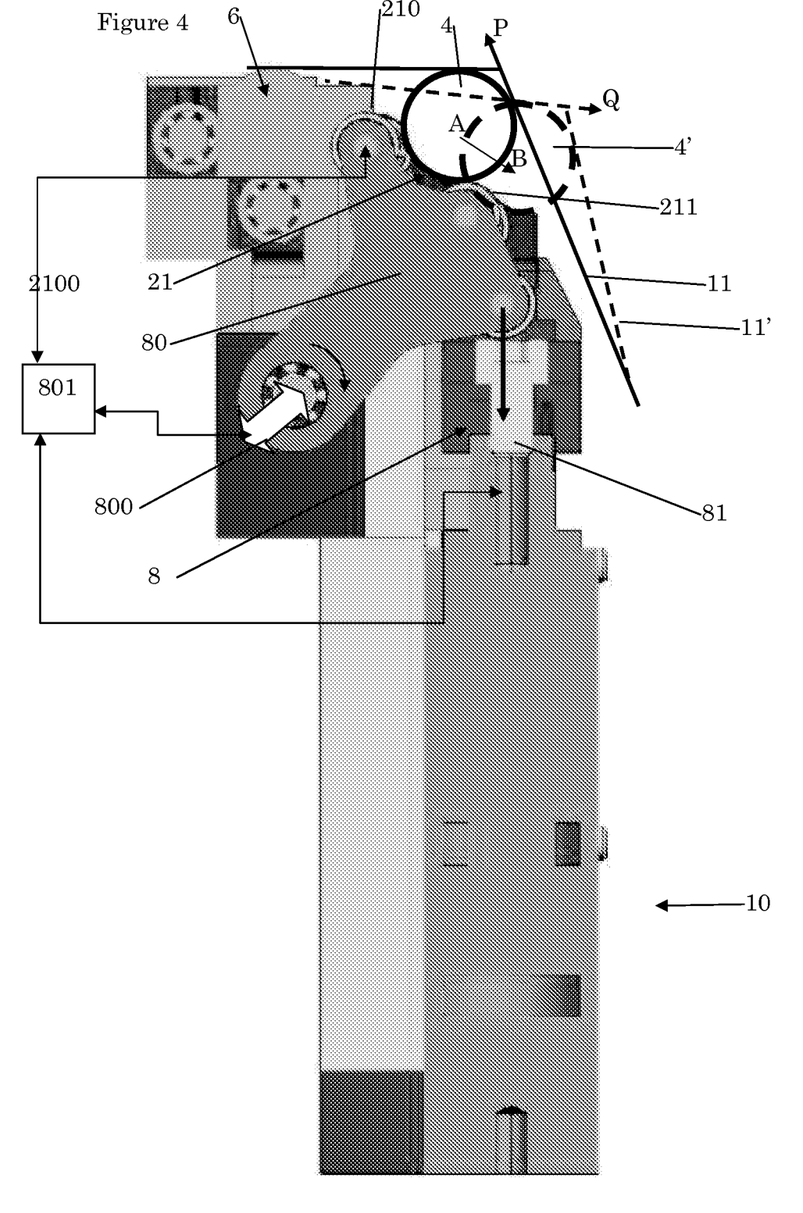
FIG. 4 shows a side view of a detail of the embodiment in FIG. 3.

FIG. 4 shows the active bearing arrangement 10 in more detail. Bearing 21 provides a bearing contact along a partial circumference of the roller via rollers 210, 211. In this way, the roller 4 is embedded in the bearing 21 and by a pressing force of the foil 11 is held in a fixed bearing position defined by the bearing contacts 210, 211 engaging an outer face of the roller 4 and partly embedding the roller 4 between the bearing rollers 210, 211. The active bearing actuation 8 defines the range and outer stops of the flexing movement of the roller 4 since the roller 4 is embedded in the bearing structure 21. Schematically, roller 4' is indicated in position B with shifted foil 11' to illustrate the flexing movement of the roller between positions A and B forcibly provided by movable bearing 21.

Thus, actuator 8 is arranged for moving the bearing element 21 to provide a forced flexing movement of the roller 4 between (at least) two bearing positions A, B.

While actuation can in principle be provided by any linear or other actuating arrangement, in the preferred embodiment the actuator 8 comprises a rotatable arm 80 rotating the at least one bearing element 21 between the two bearing positions A, B. A linear pneumatic actuator 81 is coupled to a rotatable arm 80 that carries bearing 21 for partly embedding the flexible roller 4. By pneumatic actuation, the arm 80 rotates between the two bearing positions A, B, and by the embedding arrangement, the flexible roller 4 is forcibly flexed between the two bearing positions A, B, at the same time permitting rolling movement of the roller 4 by the bearing 21. In an embodiment, bearing 21 may be provided by balls, cylinders, or suitable lubrication of a fixed surface. A rigid roller structure 6 is supported in the support structure, having outside bearings allowing rolling movement. The rotatable arm 80 flexes the curvature of the flexible roller 4 from a top position A when the foil movement is upwards in the P direction, to a lower position B when the foil movement is downwards in the opposite Q direction. The lower position B is schematically indicated by the dotted lines.

In an embodiment tension and/or displacement in the foil (11) can be measured, for example by measuring a reaction force 2100 of any of the bearing rollers (210, 211) and/or force difference between the bearing rollers 210, 211. The tension and/or displacement of the foil (11) can be adjusted by a controller 801 in response to a measurement of the tension and/or displacement in the foil, for example, by increasing or lessening of the curvature by control of actuator 81 or by suitable outward or inward movement 800 of the rotable arm (80) along the arm direction.

Passive roller assemblies 22, 20 as disclosed in the embodiment of FIG. 4 can be designed wherein bearing 21 is arranged on a rotatable arm structure 80, but without active actuation by an actuator 81.

Figure 5:
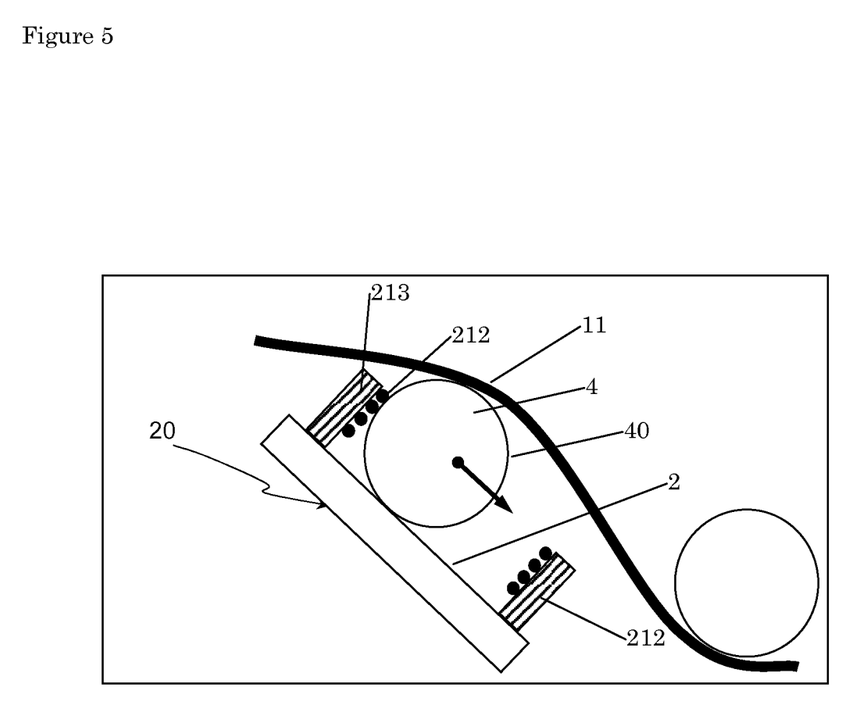
FIG. 5 shows a detail of a roller assembly.

FIG. 5 shows an alternative passive roller assembly 20. By passive, it is meant that the assembly complies reactive to a flexing movement of the roller when a central bearing is actuated and/or when the roller flexes by drag force of the foil. To the contrary, an active bearing arrangement implies provision of an actively provided force—in excess of the drag force, to forcibly actuate the flexing movement of the roller 4.

While a suitably lubricated surface 2 to provide a friction bearing, bearing contact may also be provided by rolling elements 212 engageable with the guiding roller 4 arranged on stop structure 213 defining a flexing range over which the roller 4 flexes. For example, end stops 213 are provided at either one or both ends of the intended range of flexing, thus providing stop elements 213 fixed relative to the bearing system 20.

The roller 4 can be provided as a metal rod, e.g. steel rod. In an embodiment, the rod is hollow. In another embodiment, the rod is solid. The roller stiffness is sufficiently small to allow flexing without too much force, and yet sufficiently large to define a sufficiently large bending radius of the foil to get a smooth curved shape with only a few bearings. Its surface 40 must be hard enough to be suitable as a bearing surface for the flexible bearings. When using just a few flexible bearings, like ball bearings 210 211 of a few mm axial length each, the roller surface 40 will have to be very wear-resistant. When using a friction bearing 2, where the bar can be supported a substantial length, it still has to be wear-resistant, but now the load condition is different: a low load, but on a large surface, and the contact is not rolling but shifting.

The roller surface 40 may be provided with a treatment or layer or texture (roughness) to give a sufficiently high friction coefficient between the roller 4 and the foil material 11 and/or to make it more wear resistant.

Figure 6:
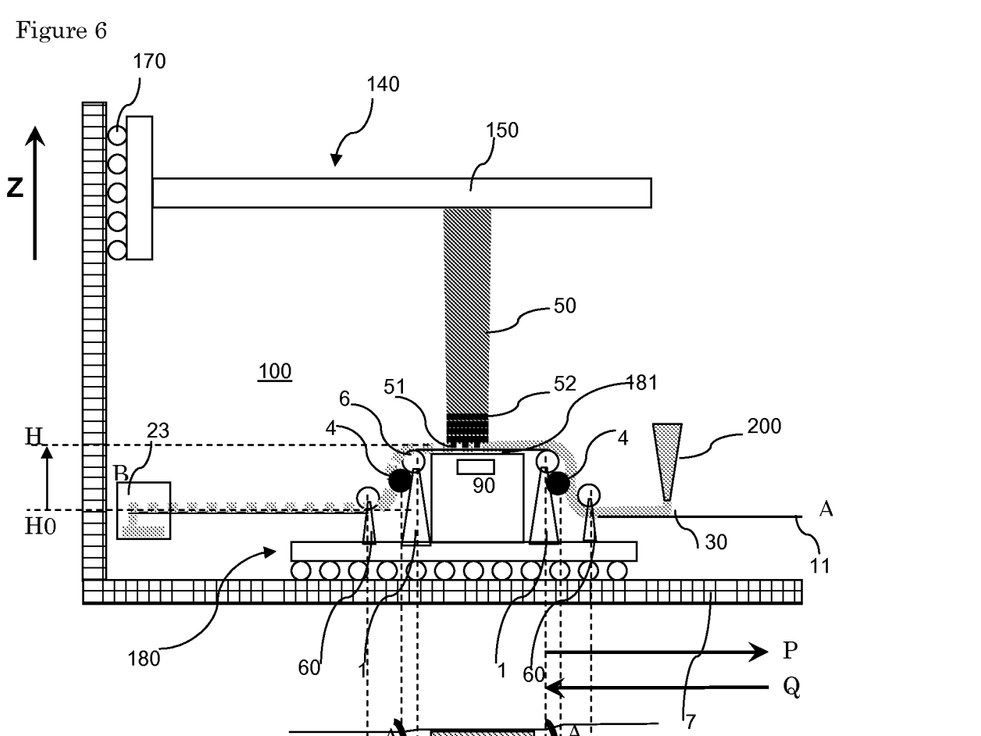
FIG. 6 shows an embodiment of the foil guiding system incorporated in an additive fabrication apparatus.

Reference is now made to FIG. 6, which shows an additive fabrication system 100 incorporating aspects of the flexible guiding system 1 as disclosed in detail in the preceding figures. The system 100 comprises a energy source 90 for solidifying a predetermined area 51 of a layer of liquid 30, said liquid layer 30 adjoining a foil 11, so as to obtain a solid layer 52 of the tangible object 50, the solid layer thus having a predetermined shape. On the foil 11, liquid layer 30 is formed of limited height to be brought in contact with the tangible object 50.

Figure 61:
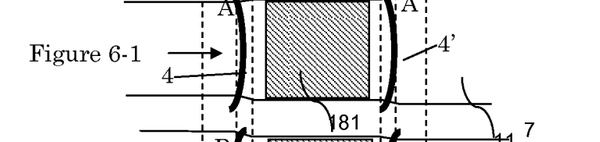
Figure 62:
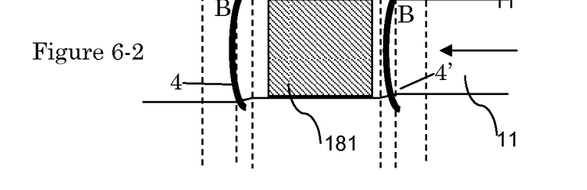

In addition, a reciprocable foil guiding stage 180 can be provided having a contact face 181 contacting foil 11 and comprising on the leading side of the contact face 181 and the trailing side of the contact face 181 a pair of upper and lower foil guides 6, 60 having the flexible foil guiding roller 4 arranged there between, the lower foil guiding element 60 defining a foil height position H0 distanced from the contact face 181 at foil height H. FIG. 6-1 illustrates a face view of foil 11 being guided over contact face 181 while stretched in the transverse direction by flexing roller 1 of bearing arrangement 1. In order to keep the foil 11 wrinkle-free the flexible guiding roller is positioned (see FIG. 6-1) as a first guiding roller 4 on a leading side of area 181, and a second flexible guiding roller 4' is positioned on a trailing side; foil 11 is pulled over both the first flexible guiding rollers 4, 4' and the foil is moved in a first direction P such that the foil 11 remains in contact with the flexible guiding rollers 4, 4' wherein the first flexible guiding roller and the second flexible guiding roller have a first curvature (A). In the reverse movement direction (see FIG. 6-2), opposite first direction Q, the flexible guiding rollers 4, 4' have a second curvature B, opposite of the first curvature A.

Accordingly the foil 11 can be guided to or from the contact face 181 to allow resin on the foil to contact a tangible object 50 by movement of the foil guiding stage 180 along the tangible object 50 while keeping the foil 11 stationary relative to the tangible object 50 during contact of the resin layer and the tangible object. It is noted that in this condition, the foil moves relative to the stage 180 in opposed directions previously indicated as P and Q. In an embodiment, the movement of the foil (11) is precluded at both ends (A and B).

To provide an optimum process conditions in certain aspects, it is desired to keep the foil 11 as flat as possible on the contact face 181. To this end, contact face 181 may be specifically designed, for example, with suction or clamping means to clamp the foil lengthwise; additionally a mechanism may be provided to keep the length of the foil under a predefined tension. The optimum tension depends on the type and thickness of the foil, but may typically be around 10 N per cm of foil width (500 N for a foil width of 50 cm). This tension may keep the foil 11 flat over the contact area 181 having contact height H. Lengthwise tension can be sufficient to keep the foil flat over the whole of this area, including its side edges and not require clamps or other tension devices on the side edges.

In another embodiment of the invention, there are also types of foil, typically those with lower modulus of elasticity, where lengthwise tension may be insufficient to keep the foil flat over the whole of the relevant area 181. In particular side edges of the foil 11 can show a tendency to move up or down or wrinkle from the intended plane. To this end, the flexible roller arrangement 1 is provided wherein flexing roller 4 flexes in accordance with the foil movement direction relative to the moving carriage 180 and which significantly reduces any wrinkling at least over a short area defined by the contact surface 181.

In this embodiment, the system 100 may comprise a liquid resin applicator 200 which, in the shown example, is filled with a resin liquid 30. Alternatively a resin layer may be provided in pre-manufactured sheet form. In an embodiment, the applicator is in the form of one or more knurled rollers.

The energy source 90 can be arranged to project a pattern through the foil 11 when the liquid layer 30 contacts the tangible object 50 in area 51. In particular, the energy source 90 can be arranged for at least partially curing at least part of an intersection pattern in the liquid layer. To enable the light or other radiation of the energy source 90 to solidify the liquid layer 3, the foil 11 is preferably substantially transparent to the radiation.

In the shown example embodiment, the energy source 90 is positioned on the movable foil guiding stage 18, between foil guiding elements 19, to expose the layer of uncured material through the foil 11. Alternatively, the energy source may be movable respective to the reciprocable foil guiding stage 180.

Movable z-stage 140 can be moved in a z-direction before a new layer of curable material is provided to the tangible object 50. Each time after solidification and separation of a new layer, carrier plate (z-stage) 150 together with the tangible object 50 including solidified layers 52 adhered thereon are moved upwards. Hence, the method for layer-wise production of a tangible object is a cyclic method, wherein the described steps of positioning, solidifying, and separating together are comprised in a single cycle step of the method.

With z-direction is meant the out of plane direction relative to the layer of curable material 51 positioned on the foil 11. The z-stage 140 may be raised while the foil guiding stage 180 is not moving. In this embodiment, rolling elements 170 enable movement of the z-stage 14. Tangible object 50 is connected to the z-stage 140 and in each method cycle a new layer is stacked from below. For sake of clarity, the layer of curable material is shown with an exaggerated thickness.

The foil 11 and the foil guiding stage 180 may be independently movable. In one operating mode, in a first step, the foil 11 is moved so as to provide a layer of curable material beneath the tangible object 50. The curable material is, at that time, not yet in contact with the tangible object 50. In a second step, the foil guiding stage 180 moves along the tangible object 50 to apply the layer of curable material 51 to the tangible object 50, expose the curable material 51 and remove the uncured material. In the second step, the foil 11 does not substantially move relative to the tangible object 50 transverse to the z-direction. After exposure, the foil may be transported towards receptacle 23.

To shorten the length direction of the stage 180, exposure unit 90 is typically limited in the carriage moving direction, for example, for working areas of about 50 cm, only about 6 cm length which can be realized with elements ('pixels', each having a LED+microlens) of 2×2 mm2, and still provide a high resolution of about 15 pixels per mm of working-area-width. Details of this arrangement are disclosed in PCT/NL2009/050783 which is hereby incorporated by reference in its entirety.

As used herein, the term 'solidifiable material' includes any material which is solidifiable (i.e., which can by polymerized and/or cross-linked) by, for example, a UV light, a laser, ionizing radiation (including but not limited to an electron beam, gamma rays or x-rays), or a combination of any of the foregoing. The term 'solidifiable material' shall also be construed to mean a composite material comprising a mixture of both solidifiable and non-solidifiable materials, such as a resin in which fibers and/or fillers are intermixed.

Partially curing comprises curing to such a degree that the intersection pattern remains stable while removing the uncured material from the layer outside the intersection pattern. The solidifiable material is not fully cured, but only to such an extent that the material is sufficiently stabilized that it is not removed with the uncured material during the step of removing the uncured material outside the intersection pattern.

Fully curing an intersection pattern needs a certain exposure time. Partially curing the intersection pattern means curing the pattern to a lower degree. When the energy source operates at the same power with which the full curing is done, the exposure may be shorter and the speed of the RM and RP processes increases.

The transition of a resin cured by UV from liquid to solid passes a so-called gel-point. "At the gel-point, one first observes the visible formation of a gel or insoluble polymer fraction. (The gel point is alternately taken as the point at which the system loses fluidity as measured by the failure of an air bubble to rise in it.) . . . The gel corresponds to the formation of an infinite network in which polymer molecules have been crosslinked to each other to form a macroscopic molecules. The gel is, in fact, considered as one molecule. The nongel portion of the polymer remains soluble in solvents and is referred to as sol. As the polymerization and gelation proceed beyond the gel-point, the amount of gel increases at the expense of the sol as more and more polymer chains in the sol are crosslinked to the gel . . . . The reaction mixture is transformed into a polymer of infinite viscosity." George Odian, "Principles of Polymerization," 4th ed.

More curing forms more bonds, e.g. cross links, to realize a higher E-modulus of the material. The degree of curing desired in partially curing may be defined by curing the solidifiable material to a degree on or near the gel-point degree of the material, where the intersection pattern remains stable while removing the uncured material from the layer outside the intersection pattern. In practice, curing to a degree on or near the gel-point degree may be interpreted as a degree within a range of about 80%-120% of the gel-point degree.

In an embodiment, the resin may be heated and discloses equipment used for heating and placement to improve the operational temperature conditions of the resin.

For the building process to work well in certain aspects, between the exposure and the separation from the foil, the resin may be cured to a certain extent, in order for the newly formed layer to adhere to the previously built layers of the object. For many resins, e.g. DSM Somos 8120 (an epoxy acrylate), exposed at 365 nm, curing is faster at a higher temperature. In fact, the mentioned resin is found in an embodiment to work well when used above room temperature, preferably approximately between 30 and 40° C. Thus it is beneficial (allows shorter time between exposure and separation) to have a provision to heat the resin to above room temperature. Surprisingly an elegant solution was found to include a small heating bar to be kept in thermal contact with the underside (non-liquid-contacting side) of the foil, in close proximity of the energy source (90). For bidirectional operation, a second heater on the opposite side of the energy source (90) may be added.

In an embodiment, the underside of the object built so far, and the top of the exposure unit, are at or around the target temperature (30° C. in the example). This state arises automatically after a number of cycles have been performed. Thus, the building process in this embodiment can be started by performing a number of 'dummy' cycles, i.e. cycles where no exposure is performed, and no vertical movement of the z-stage 150 is performed. This heats up the underside of the platform 150 and the top of the exposure unit to the required process temperature. Alternatively, other heating means can be used to pre-heat these parts before starting the actual building process.

The bearing arrangement as set forth in the preceding embodiments may comprise a single flexible roller. In addition, the bearing arrangement may comprise multiple flexible foil guiding rollers and multiple bearing systems, in particular: a first flexible foil guiding roller and a first bearing system positioned on a first side of a centerline and a second flexible foil guiding roller and a second bearing system positioned on a second side of a centerline.

In an embodiment, a method of additive fabrication can be performed comprising the steps of:

flexing at least one flexible, foil guiding roller (4) in contact with a foil (11) to a first curvature in accordance with a first rolling direction (P);

forming a liquid layer (30) on the foil (11);

moving the foil (11);

contacting the liquid layer (30) with a tangible object (50) and/or a previously solidified layer;

solidifying the liquid layer (30) thereby forming a first solidified layer which adheres to the tangible object (50) and/or a previously solidified layer;

removing the foil (11) from contact with the solidified layer;

flexing the at least one flexible, foil guiding roller (4) in contact with a foil (11) to a second curvature in accordance with a second rolling direction (Q);

forming a second liquid layer (30) on the foil (11);

moving the foil (11);

contacting the second liquid layer (30) with the tangible object (50) and/or the first solidified layer;

solidifying the second liquid layer (30) thereby forming a second solidified layer which adheres to the tangible object (50) and/or the first solidified layer;

removing the foil from contact with the solidified layer; and repeating the above steps a sufficient number of time in order to build up a three-dimensional object.

The flexible, foil guiding rollers can be flexed using any suitable method. For instance, the flexible, foil guiding rollers can be flexed using a bearing, system, the tension in the foil, or some other means. The liquid layer may be formed using any suitable method, for instance, a grooved roller (meyer bar), a small orifice, a nozzle, or other means.

The foil may be, for instance, moved by urging the foil into and out of the desired location while keeping the ends of the foil stationary. Additional suitable methods of moving the foil are, for instance, translating the foil by rotating one or more rollers in contact with the foil or exerting a pulling force on the foil.

The step of contacting the foil with the tangible object or previously solidified layer can be performed by moving either the foil or the tangible object. Similarly, the step of removing the foil from contact with the solidified layer can be performed by moving either the foil or the tangible object.

The steps of forming the liquid layer and moving the foil can occur in either order or simultaneously. Similarly, the steps of forming a liquid layer on the foil, moving the foil, contacting the liquid layer with a tangible object and/or a previously solidified layer, solidifying the liquid layer, and removing the foil from contact with the previously solidified layer can all be performed simultaneously.

The detailed drawings, specific examples and particular formulations given serve the purpose of illustration only. While the specific embodiments of the apparatus 100 described and shown herein concern building the model 50 upside down, the teachings of the present invention may be applied to apparatuses that build models right side up or at an angle. In the foregoing specification, the invention has been described with reference to specific examples of embodiments of the invention. It will, however, be evident that various modifications and changes may be made therein without departing from the broader spirit and scope of the invention as set forth in the appended claims. Furthermore, the object may have any suitable size and shape. Furthermore, the devices may be physically distributed over a number of apparatuses, while functionally operating as a single device. Also, devices functionally forming separate devices may be integrated in a single physical device. However, other modifications, variations and alternatives are also possible. The specifications and drawings are, accordingly, to be regarded in an illustrative rather than in a restrictive sense. While certain embodiments detail certain optional features as further aspects of the invention, the description is meant to encompass and specifically disclose all combinations of these features unless specifically indicated otherwise or physically impossible.

The invention claimed is:

1. An additive fabrication apparatus comprising a reciprocable foil guiding stage comprising:
    a contact face having opposite leading and trailing sides;
    an energy source arranged for at least partially curing at least part of an intersection pattern in a layer of curable material arranged on a foil and in contact with a tangible object; and
    a foil guiding system on the leading side of the contact face and the trailing side of the contact face comprising:
    a flexible, foil guiding roller; and
    a bearing system configured to alter or reverse a curvature of the flexible, foil guiding roller in accordance with a rolling direction (P,Q) of the flexible, foil guiding roller and arranged to bear the flexible, foil guiding roller, for guiding the foil including a liquid resin layer to or from the contact face to contact the tangible object by movement of the foil guiding stage along the tangible object;
    wherein the bearing system further comprises
        a bearing arrangement comprising a plurality of rolling elements engageable with the flexible, foil guiding roller; said bearing arrangement defining a bearing position having the flexible, foil guiding roller flexed in bearing engagement; said bearing arrangement engageable with an outer face of said flexible, foil guiding roller in a manner so as to thereby flex the flexible, foil guiding roller between at least two bearing positions (A, B); and
        an actuator configured for moving the bearing arrangement to provide a forced flexing movement of the flexible, foil guiding roller between two bearing positions;
    wherein said actuator is configured to directly contact at least one of said rolling elements.

2. The additive fabrication apparatus according to claim 1, wherein the foil guiding stage comprises a pair of upper and lower foil guiding elements, the lower foil guiding element defining a foil height position (H0) distanced from the contact face having arranged therebetween the flexible foil guiding roller, so as to guide the foil to or from the contact face.

3. The additive fabrication apparatus according to claim 2, wherein the foil guiding stage further comprises an applicator system for application of the liquid resin layer.

4. The additive fabrication apparatus according to claim 3, wherein the energy source is positioned adjacent the contact face so as to expose the liquid resin layer through the foil.

5. The additive fabrication apparatus according to claim 4, wherein the energy source comprises a plurality of individually operable LEDs.

6. The additive fabrication apparatus according to claim 5, wherein the bearing system
    further comprises end locking elements axially locking to the flexible, foil guiding roller.

7. The additive fabrication apparatus according to claim 6, wherein the bearing system further comprises a stop structure defining a flexing range over which the flexible, foil guiding roller flexes.

8. The additive fabrication apparatus according to claim 7, wherein the stop structure comprises stop elements fixed relative to the bearing system.

9. The additive fabrication apparatus according to claim 8, wherein the actuator is controllable in conformity with the rolling direction (P, Q).

10. The additive fabrication apparatus according to claim 6, wherein the bearing arrangement comprises a fixed bearing surface in bearing contact with the flexible, foil guiding roller.

11. The additive fabrication apparatus according to claim 6, wherein the hearing arrangement defines a hearing contact along a partial circumference of the flexible, foil guiding roller.

12. The additive fabrication apparatus according to claim 6, wherein end locking elements comprise roller bearings.

13. The additive fabrication apparatus of claim 12 further comprising:
- a measurement device in contact with the foil for measuring a tension in or a displacement of the foil; and
- a controller in communication with the bearing system and the measurement device, the controller being configured to adjust the bearing system to alter the curvature of the flexible, foil guiding roller in response to a measurement from the measurement device.

14. The additive fabrication apparatus of claim 13, wherein movement at both ends (A, B) of the foil is precluded.

* * * * *